US010283076B1

(12) United States Patent
Kim et al.

(10) Patent No.: US 10,283,076 B1

(45) **Date of Patent: *May 7, 2019**

(54) OPERATING MULTIPLE DC-TO-DC CONVERTERS EFFICIENTLY BY USING PREDICTED LOAD INFORMATION

(71) Applicant: IML International, Grand Cayman (KY)

(72) Inventors: Heonsu Kim, San Jose, CA (US); Nakchoon Choi, Pleasanton, CA (US)

(73) Assignee: IML International (KY)

( * ) Notice: Subject to any disclaimer, the term of this patent is extended or adjusted under 35 U.S.C. 154(b) by 114 days.

This patent is subject to a terminal disclaimer.

(21) Appl. No.: 14/993,965

(22) Filed: Jan. 12, 2016

Related U.S. Application Data

(63) Continuation of application No. 13/826,931, filed on Mar. 14, 2013, now Pat. No. 9,236,035.

(51) Int. Cl.

| | |
|---|---|
| ***G06F 3/038*** | (2013.01) |
| ***G09G 5/00*** | (2006.01) |
| ***G09G 3/3208*** | (2016.01) |
| ***G09G 3/34*** | (2006.01) |
| ***G09G 3/36*** | (2006.01) |

(52) U.S. Cl.

CPC .......... *G09G 5/003* (2013.01); *G09G 3/3208* (2013.01); *G09G 3/3406* (2013.01); *G09G 3/36* (2013.01); *G09G 2300/0819* (2013.01); *G09G 2330/021* (2013.01); *G09G 2360/18* (2013.01)

(58) Field of Classification Search

CPC .... G09G 5/003; G09G 3/3406; G09G 3/3208; G09G 3/36; G09G 2300/0819; G09G 2360/18; G09G 2330/021

USPC .................................................. 345/211–214

See application file for complete search history.

(56) References Cited

U.S. PATENT DOCUMENTS

| | | | |
|---|---|---|---|
| 5,274,369 | A | 12/1993 | Tsunoda et al. |
| 2004/0145584 | A1 | 7/2004 | Lee et al. |
| 2007/0139406 | A1 | 6/2007 | Ozawa et al. |

*Primary Examiner* — Rodney Amadiz

(74) *Attorney, Agent, or Firm* — Aka Chan LLP

(57) ABSTRACT

A technique analyzes an image to be displayed on a screen, before it is displayed, to determine a current draw of that image on the screen. Based on this analysis, adjustments can be made to the circuitry so that when the image is displayed, it is done so more efficiently. In a specific implementation, a DC-to-DC converter includes two boost converter circuits. Based on the analyzed image, the technique turns on a single boost converter when the current draw of that image is below an identified current threshold level, and turns on two boost converters when above the identified current threshold level.

29 Claims, 10 Drawing Sheets

OPERATING MULTIPLE DC-TO-DC CONVERTERS EFFICIENTLY BY USING PREDICTED LOAD INFORMATION

CROSS-REFERENCE TO RELATE APPLICATIONS

This patent application is a continuation of U.S. patent application Ser. No. 13/826,931, filed Mar. 14, 2013, issued as U.S. Pat. No. 9,236,035 on Jan. 12, 2016, which is incorporated by reference along with all other references cited in this application.

BACKGROUND OF THE INVENTION

This invention is related to improving the power efficiency of electronic circuits and systems, and in particular, to using multiple DC-to-DC converters more efficiently.

Electronics are essential to the modern age. People communicate, transact business, search for information, shop, and entertain using electronics and computers. People carry mobile electronic devices with them throughout their daily life. An example of a mobile electronic device is the smartphone, which is a combination of a telephone and pocket computer in single device. Other examples of mobile electronics include portable music players, portable game consoles, and other user interactive devices.

Despite the widespread success of modern electronics, people continue to desire longer run times and battery life for their mobile electronics. With longer battery life, a person will be able to continue use their smartphone longer. A person will be less likely to drop an important conversation because the battery ran out. Additionally, it is especially desirable that techniques to increase run time or battery life do not increase the size of the device or weight of the device.

Therefore, there is a need for improved power efficiency of electronic circuits and systems.

BRIEF SUMMARY OF THE INVENTION

A technique analyzes an image to be displayed on a screen, before it is displayed, to determine a current draw of that image on the screen. Based on this analysis, adjustments can be made to the circuitry so that when the image is displayed, it is done so more efficiently. In a specific implementation, a DC-to-DC converter includes two boost converter circuits. Based on the analyzed image, the technique turns on a single boost converter when the current draw of that image is below an identified current threshold level, and turns on two boost converters when above the identified current threshold level.

A DC-to-DC converter is used to supply power to output loads including LCD, OLED, and other displays devices, and also LED backlight drivers. A single DC-to-DC converter has an optimal efficiency range dependent upon operating conditions as input voltage, load current, and operating frequency and device characteristics.

When the input voltage, load current, or operating frequency does not fall within the optimal efficiency range for a single DC-to-DC converter, a second DC-to-DC boost converter is switched on to maintain high efficiency; then the DC-to-DC converter will operate as a dual boost converter.

This patent application describes a multiple DC-to-DC converter (e.g., double boost converter), including boost, buck, and buck-boost converters, that is used to increase efficiency in the conversion of one voltage to another based on an electronic device requirements and parameters.

In an implementation, a method includes: providing a number of memory buffers, each memory buffer storing an image for display; displaying a first image stored in a first memory buffer on a screen; while the first image is being displayed on the screen, determining a power requirement for displaying a second image stored in a second memory buffer on the screen, where the second image will be displayed after the first image; providing an electronic supply components that supply power to the screen, the electronic supply components having at least a first operating mode and a second operating mode; when determined the power requirement for displaying the second image is less than a first threshold level, upon displaying the second image on the display, supplying power using a electronic supply components in a first mode, where in the first operating mode, a power efficiency of the electronic supply components to supply less than the first threshold value has a first efficiency value, in the second operating mode, a power efficiency of the electronic supply components to supply less than the first threshold value has a second efficiency value, the first efficiency value greater than the second efficiency value; when determined the power requirement for displaying the second image is greater than a first threshold level, upon displaying the second image on the display, supplying power using an electronic supply components in a second mode, where in the second operating mode, a power efficiency of the electronic supply components to supply greater than the first threshold value has a third efficiency value, in the first operating mode, a power efficiency of the electronic supply components to supply greater than the first threshold value has a fourth efficiency value, the third efficiency value is greater than the fourth efficiency value.

In various implementations, the first mode includes at least two DC-to-DC converters and one converter is in the off state. The second mode includes at least two DC-to-DC converters and two converters are in the on state. The DC-to-DC converters include boost converters. The DC-to-DC converters include buck converters. The DC-to-DC converters include boost-buck converters.

In an implementation, a device including: a voltage converter circuit including a first boost circuit, a second boost circuit, and voltage output node, where the first boost circuit and second boost circuit are coupled to the voltage output node; a memory buffer including a first memory buffer frame and a second memory buffer frame; a display load, connected to the voltage output node of the voltage converter circuit and the memory buffer; a power efficiency controller, connected to the second memory buffer frame and the voltage converter circuit, where the power efficiency controller determines an estimated current draw of the display load for displaying the second memory buffer frame before being displayed on the display load, when the estimated current draw is less than a threshold value, the power efficiency controller directs the voltage converter circuit to use only one of the first boost circuit or second boost circuit at a time to generate a voltage at the voltage output node, when the estimated current draw is greater than the threshold value, the power efficiency controller controls the voltage converter circuit to use both the first boost circuit or second boost circuit to generate the voltage at the voltage output node.

In various implementations, the device includes a current mode pulse width modulation feedback control system with control signals, with or without phase shifting, to regulate the on and off state of the DC-to-DC converters. The display load includes a LCD display panel. The load includes an OLED display panel.

In an implementation, a DC-to-DC converter includes: at least two DC-to-DC converters, where each converter is turned on or off depending on threshold values of an input voltage, a load current, and an operating frequency; a battery supply for providing electrical power to the components of a device; a power efficiency controller as a block for controlling the amount of current fed to a display controller and a DC supply, where the power efficiency controller analyzes buffered images before being displayed at an output load and adjusts the power consumption at the output load based on the analyzed buffered images; a current mode pulse width modulation feedback control system with control signals, where the control signals regulate the on and off state of the DC-to-DC converters; at least two switches for controlling the on or off state of the DC-to-DC converters based on the parameters of the output load; and a display controller as a means for regulating the power distribution between different power consumption layers of a display panel.

In various implementations, the DC-to-DC converters include boost converters. The DC-to-DC converters include buck converters. The DC-to-DC converters include boost-buck converters. Power to the output load is supplied using only one converter circuit or two converter circuits depending on the efficiency of power consumption at the load. The load current is calculated from buffered images before the buffers are displayed at the output load. The output load includes of a LCD display panel. The output load includes of an OLED display panel. The display controller directs power between a LED backlight and LCD panel of a display panel. The current mode pulse width modulation feedback control system includes phase shifting control signals. The current mode pulse width modulation feedback control system has no phase shifting control signals.

In an implementation, a method for controlling the amount of current distributed to a display panel includes: analyzing memory buffers to be displayed on a screen, before it is displayed, to calculate the power required by the display panel, and regulate a current supply based on that requirement by turning on or off DC-to-DC converters; providing adjustments to the DC-to-DC converters based on input frequency or phase; providing a current mode pulse width modulation feedback control system with control signals, where the control signals regulate the on and off state of the DC-to-DC converters; adjusting the current outputs to a receiving output load where the output load has different layers of power requirement that work collectively to display an image; and switching the DC-to-DC converters on or off based on device parameters of an input voltage and load current.

In various implementations, the adjustment to the DC-to-DC converters is based on input frequency or phase includes switching on or off the DC-to-DC converters. The adjustment to the current output includes driving the backlight of the display panel with a certain amount of current based on the analyzed memory buffers and driving the LCD panel of the display with a different amount of current. The current mode pulse width modulation feedback control system includes phase shifting control signals. The current mode pulse width modulation feedback control system includes no phase shifting control signals.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
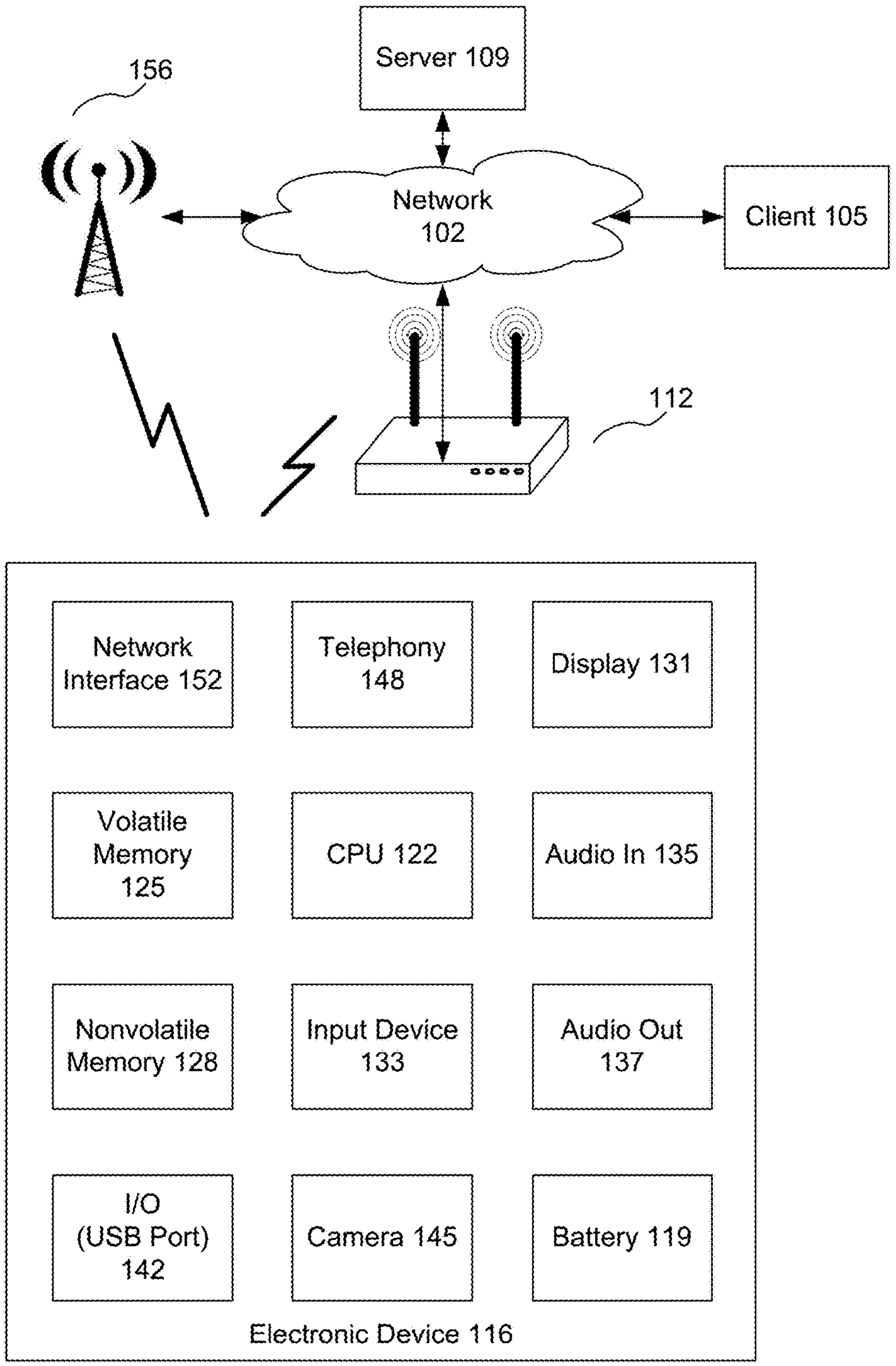
FIG. 1 shows a system diagram of a network, server, client, and details of one electronic device.

FIG. 1 shows a system diagram within which an implementation of the invention can be deployed. A distributed computer network 102 including a client 105 and server 109. There can be any number of clients and servers in the network. The network can be in the Internet or an intranet. The network can be accessed via wires (using copper), such via Ethernet (e.g., 10/100M or gigabit Ethernet), or wirelessly, such as through an access point 112 (e.g., Wi-Fi, IEEE standards 802.11, 802.11a, 802.11b, 802.11e, 802.11g, 802.11i, 802.11n, 802.11ac, and others).

A client can include a mobile electronic device 116, which can be a laptop computer, tablet, smartphone, or the like. Such devices include a battery 119 for power. Other components of the electronic device include a CPU 122, volatile memory 125 (e.g., random access memory or RAM), nonvolatile memory 128 (e.g., hard disk, Flash disk, mass storage, or the like), display 131 (e.g., LCD, OLED, or touch screen), input device 133 (e.g., keyboard, pointer, mouse, or touch screen), audio in 135 (e.g., microphone), audio out 137 (e.g., headphone jack or speaker), input-output (I/O) port 142 (e.g., to connect to another electronic device or peripheral), or camera 145 (e.g., camera with 8 megapixel resolution CMOS or CCD image sensor, or front or back cameras, or both).

Further the client, such as for a smartphone, can include a telephony interface 148 to connect to a cellular phone network or public switched telephone network (PSTN), or both. Telephony may also be via voice over IP (VOIP). Via the telephony interface, a user at the client can make phone calls.

Further the device can include a network interface 152 to connect to the computer network or phone network via a mobile phone tower or base station 156. With the electronic device, the user can make phone calls and also connect to computer data network to access the Internet. The mobile phone network may use 2G, 3G, 4G, 3GPP LTE, WiMAX, LTE, Flash-OFDM, HIPERMAN, iBurst, EDGE Evolution, UMTS, UMTS-TDD, 1×RDD, EV-DO, or other protocols. The device can access the network via the mobile phone network or Wi-Fi protocols. The device can include other wireless such as near field communication (NFC) and Bluetooth.

The electronic device can run an operating system such as the Microsoft Windows® family of operating systems (e.g., Windows 95, 98, Me, Windows NT, Windows 2000, Windows XP, Windows XP x64 Edition, Windows Vista, Windows 7, Windows, 8, Windows CE, Windows Mobile), Linux, HP-UX, UNIX, Sun OS, Solaris, Mac OS X, Apple iOS, Google Android, Alpha OS, AIX, IRIX32, or IRIX64. Other operating systems may be used. Microsoft Windows is a trademark of Microsoft Corporation.

Figure 2:
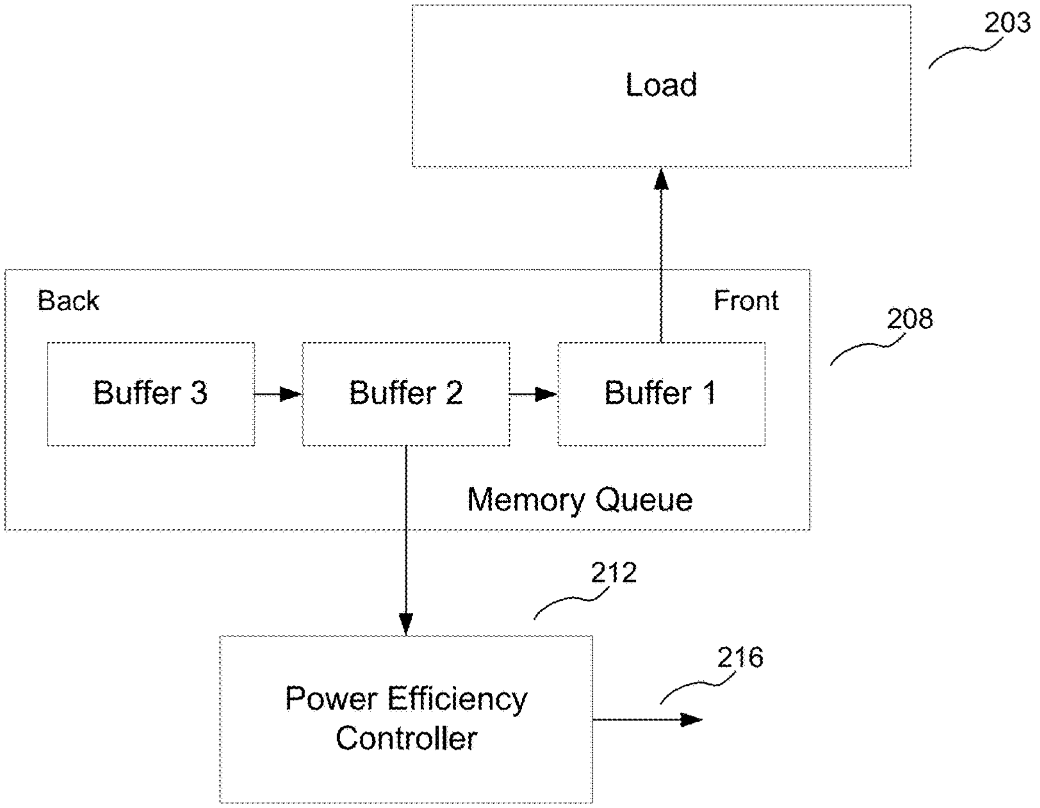
FIG. 2 shows a block diagram of a technique for improving the power efficiency of an electronic device.

FIG. 2 shows a block diagram of a technique for improving the power efficiency of an electronic device, especially a battery-operated mobile device. Users carry their mobile devices (e.g., smartphones) with them throughout the day. The users stay wirelessly connected and can make phone calls or surf the Internet from wherever they are. However, these devices can last only a limited duration before the battery is drained and they need to be recharged. Some smartphone operations use more power than other operations. For example, operations such talking on the phone or viewing a movie may higher power requirements.

The electronic device has various loads 203 that consume power. Some examples of loads include the display or touch screen, wireless radio, graphic processing unit (GPU), and CPU. The power consumption or current draw of these loads will vary depending on the conditions they are subject to. For example, certain images on the display will drain significantly more power than other images. One image on the display may drain 200 milliamps while another image drains 20 milliamps.

For a display load, the images to be shown on the screen are sent to a memory 208 before they are actually displayed. This memory can be arranged in a queue format and images are displayed in sequence from the front of the queue to the back. The memory can have any number of buffers, each of which holds a complete image for display. In the FIG. 2, there are three buffers, buffer 1, buffer 2, and buffer 3. Buffer 1 is connected to load 203 for display.

The image to be displayed on the screen or display is known because it is stored in a buffer before it is displayed. A technique is to analyze a buffer not being displayed, such as buffer 2, before its contents are displayed on load 203. A power efficiency controller 212 analyzes the buffered image before it is displayed (e.g., buffer 2 or other buffer before display). The controller generates an output or control signal 216 which is used to make adjustments so that power consumption of the load occurs more efficiently. The controller will reduce power consumption and will increase the overall battery run time of the device.

Figure 3:
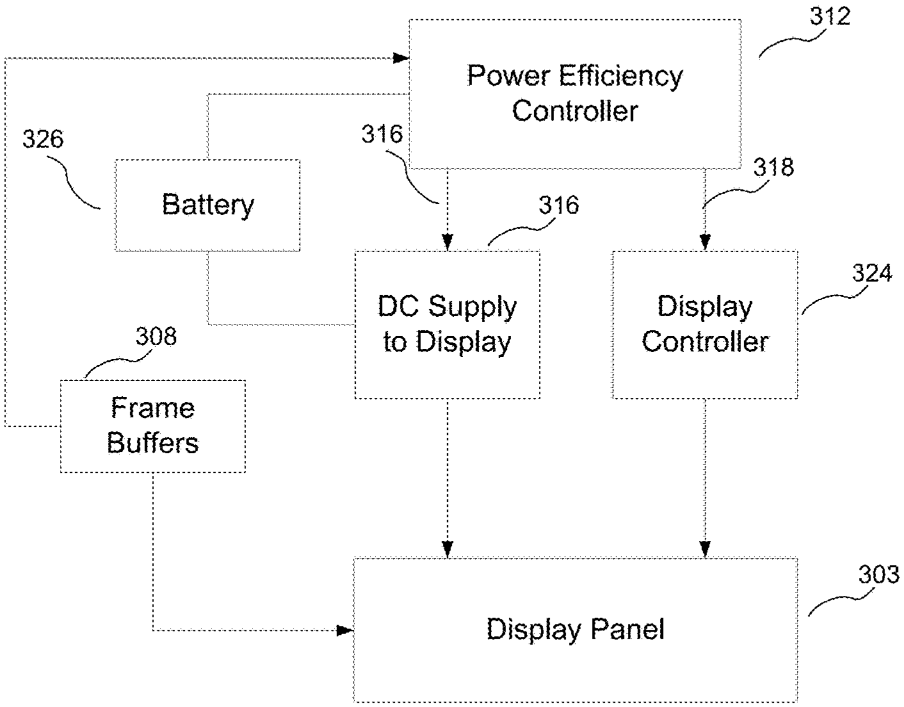
FIG. 3 shows a block diagram for a specific implementation for improving power efficiency of an electronic device.

FIG. 3 shows a block diagram for a specific implementation for improving power efficiency of an electronic device. In this implementation, the load is a display panel or screen 303. Images for display on the screen are stored in a frame buffer 308 (including a number of buffers). This frame buffer is a queue that stores images that are to be displayed on the screen. Images are displayed on the screen at frame rate of, for example, 15 Hertz, 24 Hertz, 30 Hertz, 50 Hertz, 60 Hertz, 120 Hertz, or other.

The display panel has a specific current load depending on what is displayed. Some images use more current (e.g., 200 milliamps) while other images use much less current (e.g., 20 milliamps). Before a particular image is displayed on the screen, a power efficiency controller 312 analyzes the image to be displayed. Then the power efficiency controller generates control signals 316 and 318. These control signals are used to alter the operation of the circuitry so that display load uses power more efficiently.

In a mobile electronic device such a smartphone or tablet, the display is one of the components that uses significant amounts of power. Improving the power efficiency of the display can extend battery life for the device significantly.

A battery 320 supplies power to the device including the display (and power efficiency controller), but the voltage levels of the battery are usually are not directly compatible with the electronic circuits. For example, the battery may be a lithium ion, lithium air, nickel metal hydride, nickel cadmium, or other rechargeable battery type. The voltage level output of the battery is determined by the battery chemistry. Therefore a DC-to-DC converter is used to convert the battery voltage to a voltage compatible with the display and other electronic components. The DC-to-DC converter can also regulate the voltage to provide a stable voltage level (e.g., by using capacitors or capacitance).

Examples of DC-to-DC converters include a boost converter and buck converter. A boost converter is used to create an output voltage at a higher level than its input voltage. A buck converter is used to create an output voltage at a lower level than its input voltage.

Signal 316 from the power efficiency controller is connected to a DC supply to display block 322, which is connected to the display panel. The DC supply can be a DC-to-DC converter. The power efficiency controller alters the operation of DC supply 322 depending on the image to be displayed, so that when the image is displayed, the DC supply operates more efficiently or and the display load has less power consumption, or both.

Signal 318 is connected to a display controller block 324, which is connected to the display panel. The power efficiency controller alters the operation of display controller 324 depending on the image to be displayed, so that when the image is displayed, the display load has less power consumption.

Figure 4:
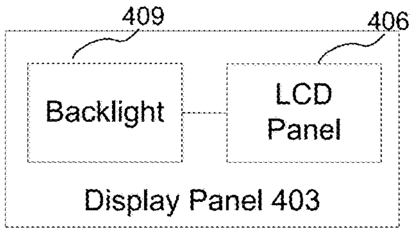
FIG. 4 shows more detail of a LCD-type display panel.

FIG. 4 shows more detail of a LCD-type display panel 403 (which can be used as a display panel 303). An LCD is a liquid crystal display having a flat panel 403 portion and a backlight 409 portion. The LCD panel does not emit light, so a backlight is placed behind the panel for illumination. Some examples of LCD panels include thin film transistor liquid crystal display (TFT-LCD), in-plane switching (IPS) TFT, patterned vertical alignment (PVA) TFT, and plane line switching (PLS) TFT, just to name a few. Some examples of backlight technology includes fluorescent (e.g., CCFL, HCFL, or EEFL) or light-emitting diodes (LEDs).

The liquid crystal elements or TFT elements of the LCD panel can be electronically controlled make a black screen. To do this, the liquid crystal elements block the light from the backlight from shining through. However, a black screen can also be created by turning down or turning off the backlight. In a typical LCD display, a larger percentage of power is consumed by the backlight than the LCD panel. Therefore, turning down or turning off the backlight will reduce power consumption more than leaving the backlight fully on, and manipulating the TFT element of the LCD panel only.

In an implementation, display controller 324 is connected to control the LCD display panel 403, so that it efficiently displays images using less power. The image to be displayed is analyzed (e.g., for brightness level), and operation of the display panel is altered so that backlight is at a lower level while manipulating the TFT elements to allow greater light to pass through. The end result is the image displayed will be the same or similar to the analyzed image, but the backlight is at a lower brightness level, using less power, and this is compensated by adjusting the TFT elements to allow more light through.

Depending on the frame rate, the power efficiency controller should complete its analysis and generate a solution before the next frame is to be displayed. For a 60 Hertz frame rate, the power efficiency controller has about 16.666 milliseconds.

Figure 5:
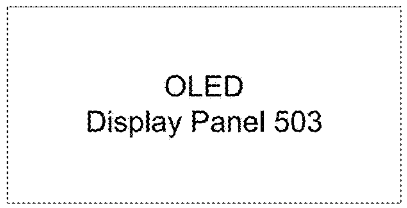
FIG. 5 shows more detail of an OLED-type display panel.

FIG. 5 shows more detail of an OLED-type display panel 503 (which can be used as a display panel 303). An OLED or an organic light-emitting diode is a light-emitting diode in which the emissive electroluminescent layer is a film of organic compound which emits light in response to an electric current. An OLED display works without a backlight because the elements themselves emit light.

OLED displays can use either passive-matrix (PMOLED) or active-matrix addressing schemes. Active-matrix OLEDs (AMOLED) use a thin-film transistor backplane to switch each individual pixel on or off, but allow for higher resolution and larger display sizes.

In an implementation, display controller 324 is connected to control the OLED display panel 503, so that it efficiently displays images using less power by analyze the images before display on the panel.

Figure 6:
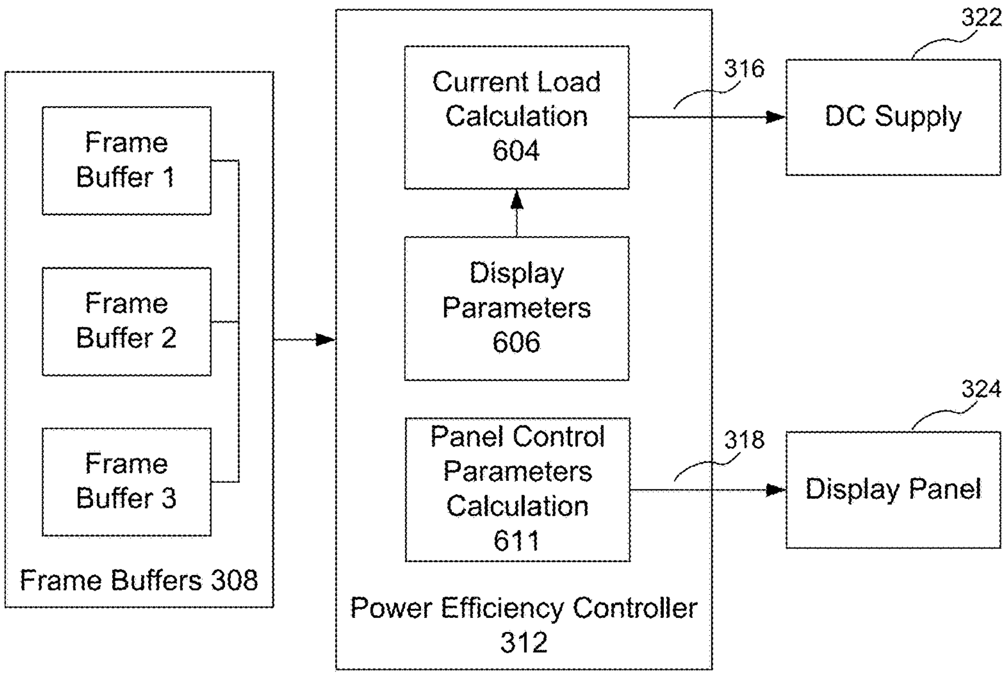
FIG. 6 shows a more detailed block diagram of power efficiency controller.

FIG. 6 shows a more detailed block diagram of power efficiency controller 312 for improving power efficiency of an electronic device. Frame buffer 308 includes three frame buffers, frame buffer 1, frame buffer 2, and frame 3. As discussed, each buffer stores an image for display. The frame buffer can have any number of buffers to store images (e.g., more than three buffers). The sizes of the buffers can change depending on the resolution of the display or image to be displayed. The greater the number of buffers, the more images that can be stored. Larger images or higher resolution images generally require a larger buffer size.

To generate signal 316 (which can include one or more signals), power efficiency controller 312 includes a current load calculation block 604 which takes input from a display parameters block 606. To generate signal 318 (which can include one or more signals), power efficiency controller 312 includes a panel control parameters calculation block 611.

The current load calculation block calculates the current or power requirements for the display load for an image stored in the frame buffer before that image is displayed on the screen. The controller generates signal 316 to control operation of DC supply 322 for power efficiency. To perform its calculations, information about the characteristics of the display is used, and these characteristics can be stored in the display parameters block. These parameters in the display parameters block may be hard coded (e.g., read only memory (ROM)) or programmed (e.g., Flash or programmable read only memory (PROM)) during the manufacture of the device.

The panel control parameters calculation block analyzes the image for an image stored in the frame buffer before that image is displayed on the screen. Block 611 generates signal 318 to control operation of display controller 324 for power efficiency.

Figure 7:
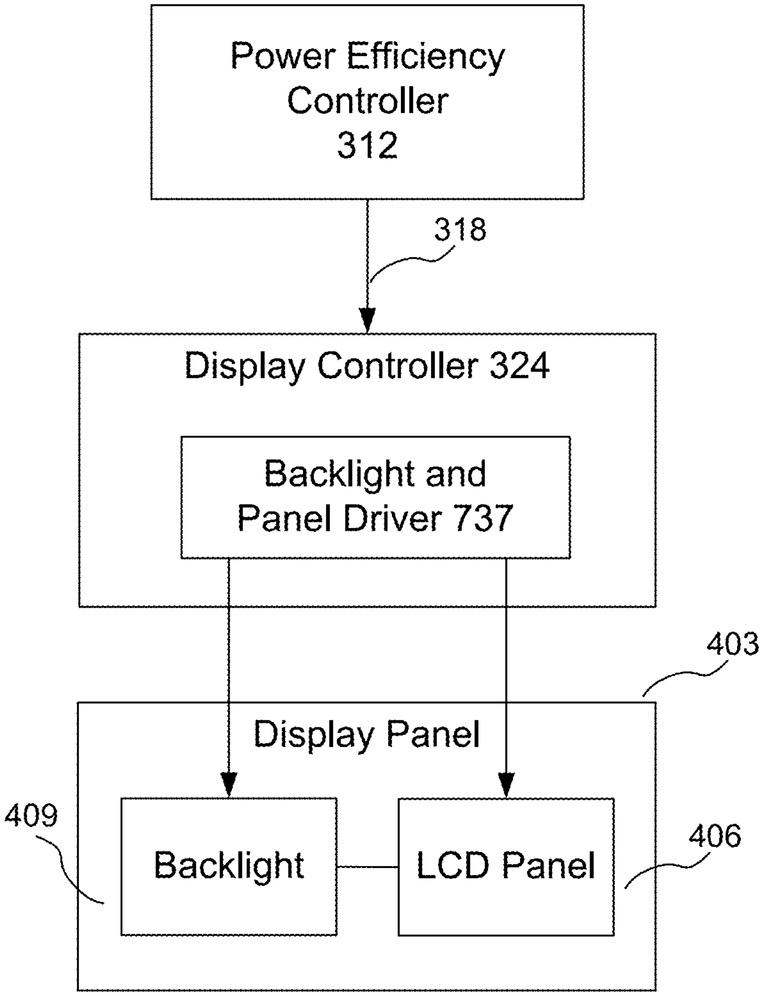
FIG. 7 shows a more detailed block diagram of display controller.

FIG. 7 shows a more detailed block diagram of display controller 324 for improving power efficiency of an electronic device. The controller includes a backlight and panel driver block 737, which has signals outputs driving the backlight and LCD panel of display 403.

As described above, these signals alter a balance (or power distribution) between the backlight and LCD panel. Then the total power consumed by display 403, which is a combination of the power of the backlight plus LCD panel, is reduced. In a specific example, the controller will cause an image to be displayed on the screen which appears the same or similar as intended, but the backlight illumination will be reduced to conserve power.

Figure 8:
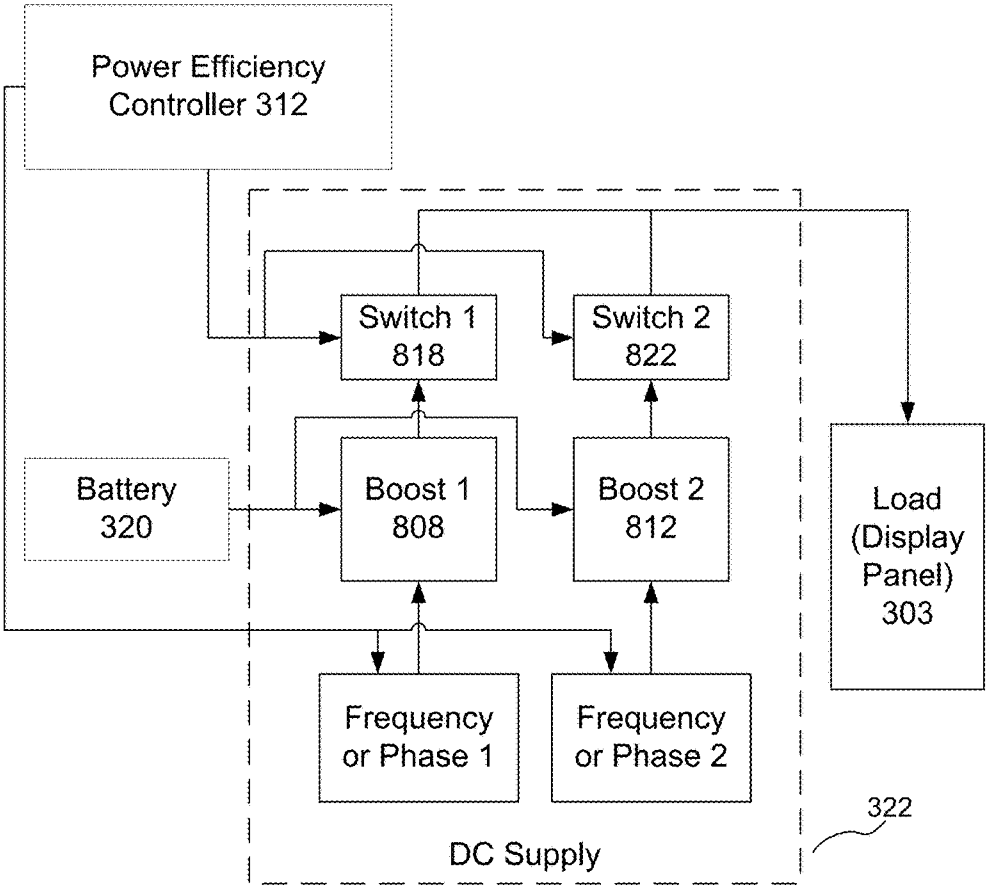
FIG. 8 shows a more detailed block diagram of DC supply having two boost converters.

FIG. 8 shows a more detailed block diagram of DC supply 322. DC supply 322 includes two boost converter circuits 808 and 812. Battery 804 is connected to these boost converters. Boost converter circuit 1 808 is connected to the display panel via a switch 1 818, and boost converter circuit 2 812 is connected to the display panel via a switch 1 822. A frequency or phase block 1 828 inputs to boost converter circuit 1. A frequency or phase block 2 832 inputs to boost converter circuit 2. Power efficiency controller 312 is connected to control operation of switches 1 and 2.

In this configuration, the power to the display can be supplied using only one boost converter circuit (e.g., only boost 1 or boost 2 is on) or two boost converter circuits (e.g., both boost 1 or boost 2 are on). Depending on the conditions on display load, using one or two boost circuits will be more efficient.

In particular, one boost converter operates most efficiently in a range from 0 to 100 milliamps (or other range). When more current is needed, although one boost converter can supply the current, it does not do so as efficiently. Then two boost converters can be used to share the load.

For example, when the image to be displayed has a calculated current draw of, for example, 50 milliamps, one boost converter will be used. The other boost converter is turned off to reduce power consumption. When the image to be displayed has a calculated current draw of, for example, 150 milliamps, two boost converter will be used.

As discussed above, the power efficiency controller does its calculation of the power consumption or current draw based on the image stored in the buffer, before it is displayed. And when that image is displayed, the number of boost converters used will be appropriate to improve efficiency.

Although two boost converters are shown in this example, the principles of the invention can apply to a circuit having any number of boost converters, two or more, three, four, or five, or more. The principles are also applicable to buck converters, as well as other circuits.

Figure 9:
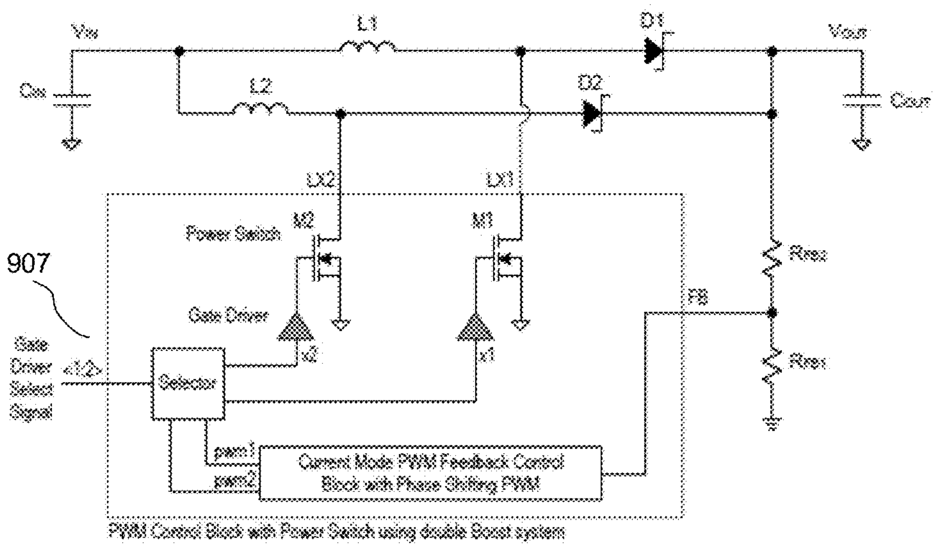
FIG. 9 shows a schematic of a specific implementation for a double boost system.

FIG. 9 shows a schematic of a specific implementation for a double boost system. The DC-to-DC converter has two boosts. A first boost converter includes M1, inductor L1, and diode D1. A second boost converter includes M2, inductor L2, and diode D2. The two boosts are selectable by an external signal, a gate driver select signal 907. Power switch M1 and M2 are turned on or off respectively by the gate driver select signal.

To manipulate power switches M1 and M2, the gate driver select signal is determined with output load condition, input voltage, and switching frequency to find a more efficient driving condition. To provide an example, M1 and M2 are optimized for efficiency at 50 milliamps. If load current is needed is 100 milliamps, M1 and M2 both will be turned on. If 50 milliamps load current, one of M1 or M2 is turned off. Power switch M1 and M2's efficiency is programmed as a preset data in system controller like timing controller on LCD panel.

The first boost converter circuit with M1, L1, and D1 and second boost converter circuit with M2, L2, and D2 operate similarly. Operation of the first boost converter is as follows: When switch M1 is closed, current flows through the inductor that is connected to the power switch and the energy is stored in L1. When a switch is subsequently turned off, the stored energy in L1 adds to the input voltage, thereby increasing the total output voltage to the load. D1 prevents current at the output node from flowing back to the input node. While M1 is being opened and closed (e.g., oscillating input signal), the voltage at the output node will be boosted to a higher level than at the input. To turn off first boost converter circuit, M1 can be held in a closed state (or an open state).

Figure 10:
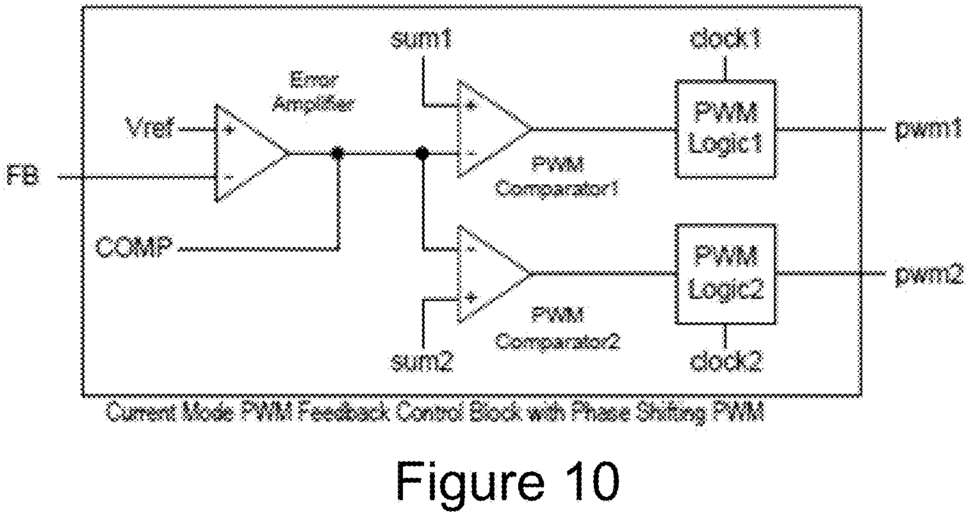
FIG. 10 shows a schematic of an implementation of the current mode pulse width modulation control block with phase shifting control signals.
Figure 11:
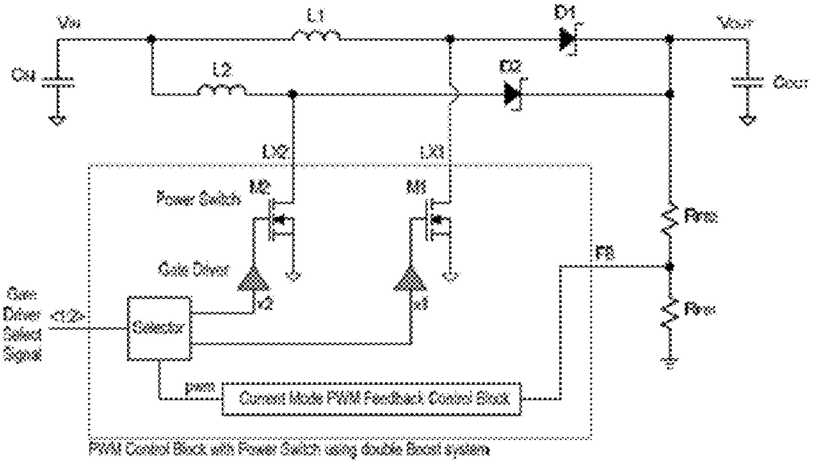
FIG. 11 shows a schematic of another implementation of a double boost system.
Figure 12:
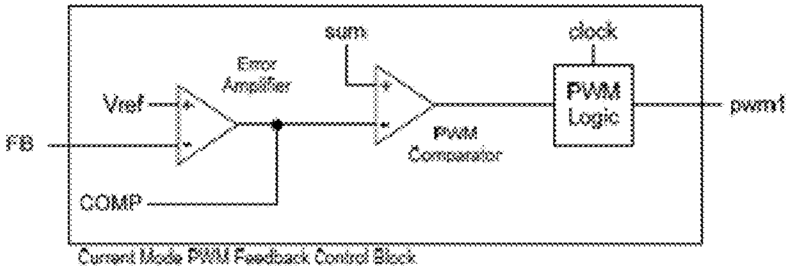
FIG. 12 shows a schematic of an implementation of the current mode pulse width modulation control block.

Feedback is taken from an output node FB by a current mode PWM feedback control block and generates PWM1 and PWM2 signals. FIG. 10 shows a schematic of an implementation of the current mode pulse width modulation control block with phase shifting control signals. The PWM1 and PWM2 signals control whether (i) the first boost is on and second boost is off, (ii) the first boost is off and second boost is on, or (iii) the first boost is on and second boost is on. FIG. 11 shows a schematic of another implementation of a double boost system. This system does not use phase shifting. Feedback is taken from FB by a current mode pulse width modulation control block to generate a PWM signal. FIG. 12 shows a schematic of an implementation of the current mode pulse width modulation control block.

Figure 13:
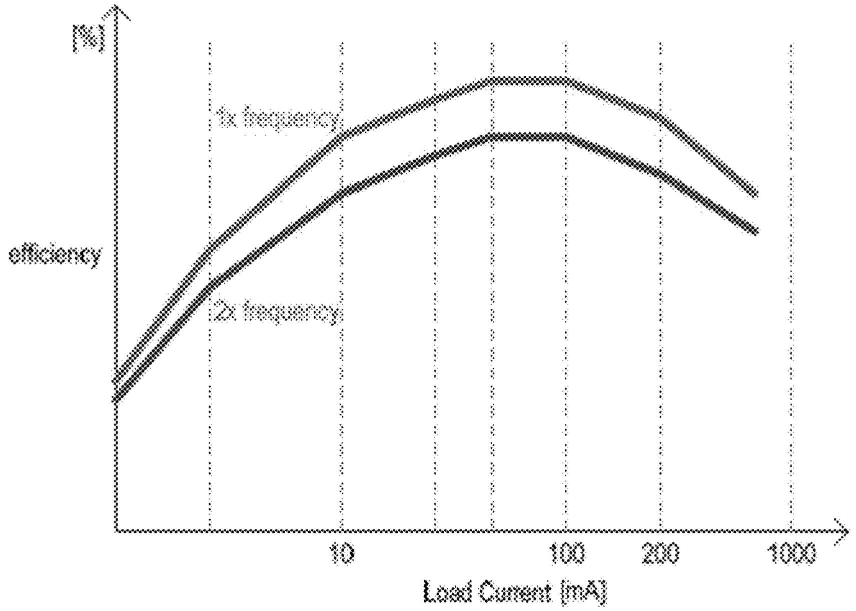
FIG. 13 shows a graph of how the double boost system responds to a change in the operating frequency.

FIG. 13 shows a graph of how the double boost system responds to a change in the input frequency. There is a relative decrease in power efficiency of the system with an increase in input frequency. A double boost system can be implemented when there is change in frequency to optimize the power efficiency.

Figure 14:
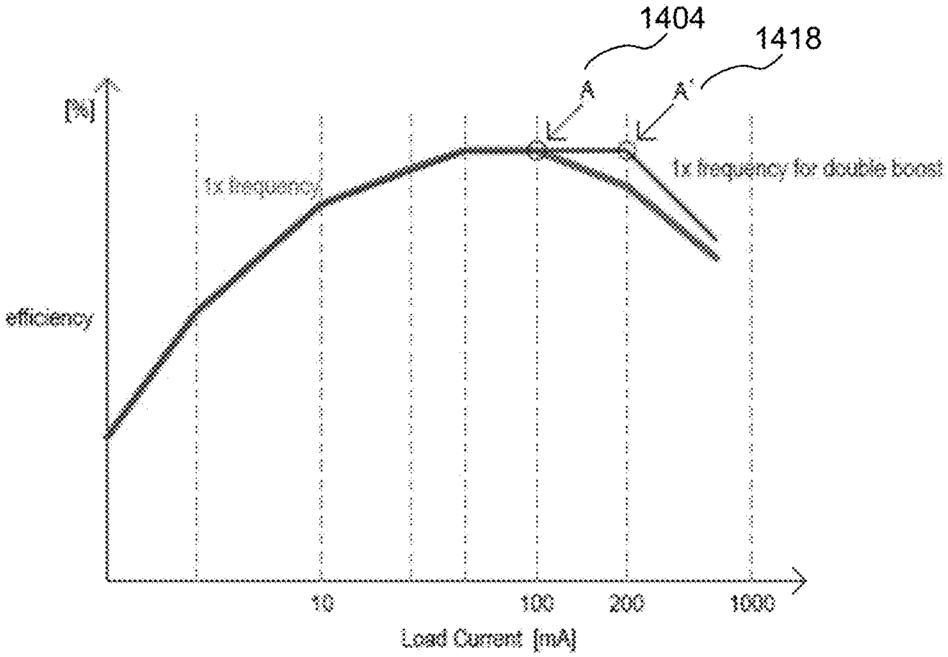
FIG. 14 shows a graph of an increase in efficiency with a double boost system.

FIG. 14 shows a graph of an increase in efficiency with a double boost system in comparison with a normal system without the double boost at a single frequency. A line A 1404 shows the system response at a set frequency without the double boost system. A line A' 1408 shows the system with the same set frequency with a double boost converter. The double boost converter increases the power efficiency response at the same set frequency.

Figure 15:
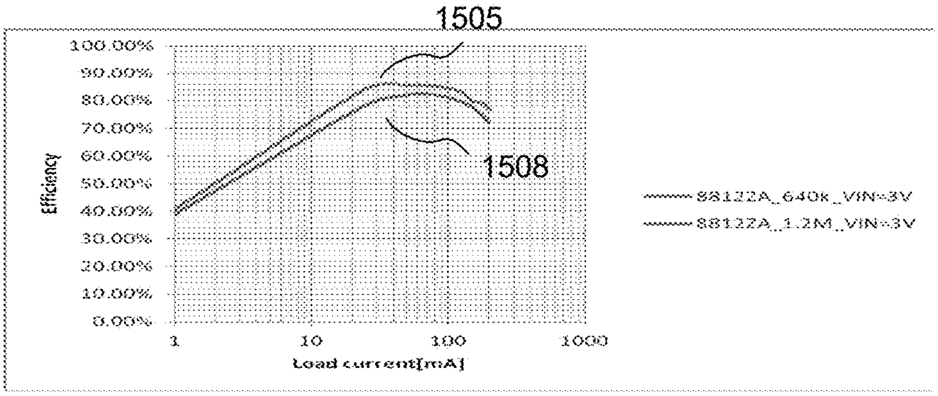
FIG. 15 shows a relationship between efficiency and load current with different switching frequencies.

FIG. 15 shows a relationship between efficiency and load current with different switching frequencies for a 3-volt input. A line 1505 shows the efficiency response with different load current in milliamps at set frequency of 640 kilohertz. A line 1508 shows the efficiency response with different load current in milliamps at set frequency of 1.2 megahertz. The natural efficiency changes along with the switching frequency. For example, at 4 volt and 200 milliamps load current, the efficiency is 84.4 percent, while it is 71.99 percent at 3 volt with the same load current. A technique selects either a single DC-to-DC converter or dual DC-to-DC converter to supply the load current in order to continue a higher efficiency as the load current changes.

Figure 16:
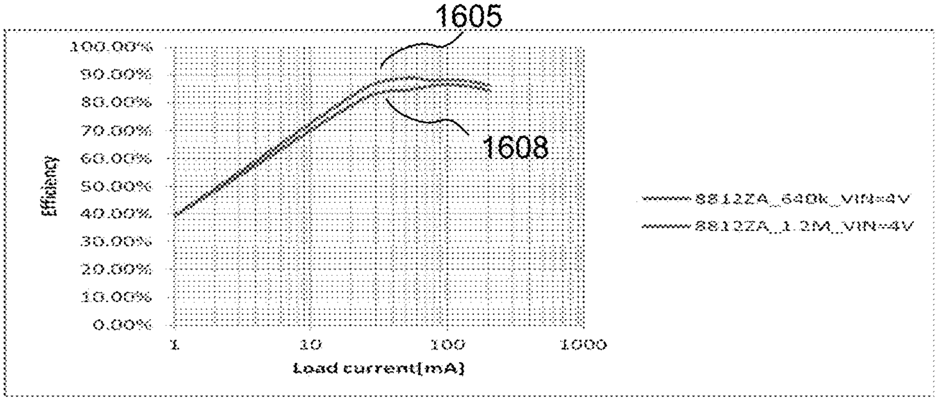
FIG. 16 shows a graph of the relationship between efficiency and load current with different switching frequencies.

FIG. 16 shows a graph of the relationship between efficiency and load current with different switching frequencies at a 4-volt input. A graph 1605 depicts the efficiency response with different load current in milliamps at set frequency of 640 kilohertz. A graph 1608 depicts the efficiency response with different load current in milliamps at set frequency of 1.2 megahertz. The double boost system continues to maintain a higher efficiency as the load current changes from 100 milliamps to 200 milliamps by choosing either a single DC-to-DC converter or dual DC-to-DC converter to supply the load current.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method for controlling the amount of current distributed to a display panel comprising:

analyzing memory buffers comprising an image to be displayed on a screen, before the image is displayed, to calculate an estimated power required by the image on the display panel;

regulating a current supply based on that estimated power requirement by turning on or off at least two DC-to-DC converters, wherein a first DC-to-DC converter is coupled through a first diode to an output node, a second DC-to-DC converter is coupled through a second diode to the output node, a first impedance is coupled between the output node and a feedback node, a second impedance is coupled between the feedback node and a reference voltage;

providing adjustments to the DC-to-DC converters based on at least one of input frequency or phase;

providing a current mode pulse width modulation feedback control system with control signals, wherein the feedback node is input to the current mode pulse width modulation feedback control system and the control signals regulate an on and off state of each of the DC-to-DC converters;

adjusting a current output to a receiving output load wherein the output load has different layers of power requirement that work collectively to display the image; and switching each of the DC-to-DC converters on or off based on device parameters of an input voltage and load current, wherein the adjustment to the current output comprises driving a backlight of the display panel with a certain amount of current based on the analyzed memory buffers and driving an LCD panel of the display with a different amount of current.

2. The method of claim 1 wherein the adjustment to the DC-to-DC converters is based on at least one of input frequency or phase comprises at least one of:

switching on the first DC-to-DC converter and off the second DC-to-DC converter, switching off the first DC-to-DC converter and on the second DC-to-DC converter, and switching on the first DC-to-DC converter and on the second DC-to-DC converter.

3. The method of claim 1 wherein the current mode pulse width modulation feedback control system comprises phase shifting control signals.

4. The method of claim 1 wherein the current mode pulse width modulation feedback control system comprises no phase shifting control signals.

5. A device comprising:

a voltage converter circuit comprising a first boost circuit, a second boost circuit, and a voltage output node, wherein the first boost circuit and second boost circuit are coupled to the voltage output node, a first frequency circuit having a first frequency is coupled to the first boost circuit, and a second frequency circuit having a second frequency is coupled to the second boost circuit;

a memory buffer comprising a first memory buffer frame and a second memory buffer frame;

a display load, coupled to the voltage output node of the voltage converter circuit and the memory buffer;

a power efficiency controller, coupled to the second memory buffer frame and the voltage converter circuit, wherein the power efficiency controller determines an estimated current draw of the display load for displaying the second memory buffer frame before being displayed on the display load and while the first memory buffer frame is being displayed on the display load, when the estimated current draw is less than a threshold value, the power efficiency controller directs the voltage converter circuit to use only one of the first boost circuit and first frequency circuit or second boost circuit and second frequency circuit at a time to generate a voltage and first current value at the voltage output node, when the estimated current draw is greater than the threshold value, the power efficiency controller controls the voltage converter circuit to use both the first boost circuit and first frequency circuit and second boost circuit and second frequency circuit to generate the voltage and a second current value at the voltage output node, and the second current value is different from the first current value.

6. The device of claim 5 wherein the device comprises a current mode pulse width modulation feedback control system with control signals, with or without phase shifting, to regulate the on and off state of the first and second boost circuits.

7. The device of claim 5 wherein the display load comprises an LCD display panel.

8. The device of claim 5 wherein the load comprises an OLED display panel.

9. The method of claim 5 wherein the first frequency is different from the second frequency.

10. A DC-to-DC converter comprising:

at least two DC-to-DC converters, wherein each converter is turned on or off depending on threshold values of an input voltage, a load current, and an operating frequency, and the at least two DC-to-DC converters are coupled to a feedback node;

a battery supply for providing electrical power to the components of a device;

a power efficiency controller as a block for controlling the amount of current fed to a display controller and a DC supply, wherein the power efficiency controller analyzes buffered images before being displayed at an output load and adjusts the power consumption at the output load based on the analyzed buffered images;

a current mode pulse width modulation feedback control system with control signals, wherein the current mode pulse width modulation feedback control system comprises an amplifier comprising an input coupled to the feedback node, and the control signals regulate the on and off state of the DC-to-DC converters;

at least two switches for controlling the on or off state of the DC-to-DC converters based on the parameters of the output load; and a display controller as a means for regulating the power distribution between different power consumption layers of a display panel, wherein the adjustment to power consumption at the output load comprises driving a backlight of the display panel with a certain amount of current based on the analyzed buffered images and driving an imaging panel of the display panel with a different amount of current.

11. The converter of claim 10 wherein the buffered images are stored in a frame buffer, and while the power efficiency controller analyzes buffered images before being displayed at an output load, a buffered image in the frame buffer is being displayed at the output load.

12. The converter of claim 10 wherein the DC-to-DC converters comprise boost converters.

13. The converter of claim 10 wherein the DC-to-DC converters comprise buck converters.

14. The converter of claim 10 wherein the DC-to-DC converters comprise boost-buck converters.

15. The converter of claim 10 wherein power to the output load is supplied using only one converter circuit or two converter circuits depending on the efficiency of power consumption at the load.

16. The converter of claim 10 wherein the load current is calculated from buffered images before the buffers are displayed at the output load.

17. The converter of claim 10 wherein the output load comprises an LCD display panel.

18. The converter of claim 10 wherein the output load comprises an OLED display panel.

19. The converter of claim 10 wherein the display controller directs power between an LED backlight and an LCD panel of a display panel.

20. The converter of claim 10 wherein the current mode pulse width modulation feedback control system comprises phase shifting control signals.

21. The converter of claim 10 wherein the current mode pulse width modulation feedback control system comprises no phase shifting control signals.

22. The converter of claim 10 wherein the display panel is an LCD-type panel, and the imaging panel comprises thin film transistor (TFT) elements.

23. The converter of claim 10 wherein the at least two DC-to-DC converters are coupled through an impedance to the feedback node.

24. A method comprising:

providing a plurality of memory buffers, each memory buffer storing an image for display;

displaying a first image stored in a first memory buffer on a screen;

while the first image is being displayed on the screen, determining a power requirement for displaying a second image stored in a second memory buffer on the screen, wherein the second image will be displayed after the first image;

providing electronic supply components that supply power to the screen, the electronic supply components having at least a first mode and a second mode;

when the power requirement determined for displaying the second image is less than a first threshold level, upon displaying the second image on the display, supplying power using the electronic supply components in the first mode; and when the power requirement determined for displaying the second image is greater than a first threshold level, upon displaying the second image on the display, supplying power using the electronic supply components in the second mode, wherein in the first mode, a power efficiency of the electronic supply components to supply less than the first threshold value has a first efficiency value, in the second mode, a power efficiency of the electronic supply components to supply less than the first threshold value has a second efficiency value, and the first efficiency value is greater than the second efficiency value, and wherein in the second mode, a power efficiency of the electronic supply components to supply greater than the first threshold value has a third efficiency value, in the first mode, a power efficiency of the electronic supply components to supply greater than the first threshold value has a fourth efficiency value, and the third efficiency value is greater than the fourth efficiency value.

25. The method of claim 24 wherein the first mode comprises at least two DC-to-DC converters and one converter is in the off state.

26. The method of claim 24 wherein the second mode comprises at least two DC-to-DC converters and two converters are in the on state.

27. The method of claim 24 wherein the electronic supply components comprises at least two DC-to-DC converters comprising boost converters.

28. The method of claim 24 wherein the electronic supply components comprises at least two DC-to-DC converters comprising buck converters.

29. The method of claim 24 wherein the electronic supply components comprises at least two DC-to-DC converters comprising boost-buck converters.

* * * * *